(12) United States Patent
Tao et al.

(10) Patent No.: US 10,623,405 B2
(45) Date of Patent: Apr. 14, 2020

(54) COMMUNICATION SYSTEM, ACCESS AUTHENTICATION METHOD AND SYSTEM BASED ON COMMUNICATION SYSTEM

(71) Applicant: ZTE CORPORATION, Shenzhen (CN)

(72) Inventors: Quanjun Tao, Shenzhen (CN); Tian Tian, Shenzhen (CN); Se Wu, Shenzhen (CN); Jinguo Zhu, Shenzhen (CN); Baoguo Xie, Shenzhen (CN); Wenxian Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 551 days.

(21) Appl. No.: 15/319,930

(22) PCT Filed: Oct. 17, 2014

(86) PCT No.: PCT/CN2014/088868
§ 371 (c)(1),
(2) Date: Mar. 30, 2017

(87) PCT Pub. No.: WO2015/192562
PCT Pub. Date: Dec. 23, 2015

(65) Prior Publication Data
US 2017/0208063 A1 Jul. 20, 2017

(30) Foreign Application Priority Data
Jun. 17, 2014 (CN) .......................... 2014 1 0271224

(51) Int. Cl.
*H04L 29/06* (2006.01)
*G06F 16/955* (2019.01)
(Continued)

(52) U.S. Cl.
CPC ........ *H04L 63/0876* (2013.01); *G06F 16/955* (2019.01); *H04L 63/102* (2013.01);
(Continued)

(58) Field of Classification Search
CPC ..................... H04L 63/0876; H04W 12/00512
See application file for complete search history.

(56) References Cited

U.S. PATENT DOCUMENTS

| | | | |
|---|---|---|---|
| 2001/0053135 A1* | 12/2001 | Carpelan ............... | H04W 12/12 370/329 |
| 2002/0032869 A1* | 3/2002 | Lamberton ............. | H04L 63/10 726/3 |

(Continued)

FOREIGN PATENT DOCUMENTS

| | | |
|---|---|---|
| CN | 1881876 | 12/2006 |
| CN | 102394818 | 3/2012 |

(Continued)

OTHER PUBLICATIONS

Extend European Search Report for EP 14895450.6, completed by the European Patent Office on May 18, 2017 All together 9 Pages.
(Continued)

*Primary Examiner* — Ponnoreay Pich
(74) *Attorney, Agent, or Firm* — Cooper Legal Group, LLC

(57) ABSTRACT

A communication system and an access authentication method and system based on such a communication system are described. In the system, a context generation function entity is arranged to generate a user context and store the generated user context in a context database matched with the context generation function entity, and a service access control function entity is arranged to acquire the user context from the context database and authenticate a terminal initiating an access request by adopting the user context. According to systems and methods described, effects of a simple access authentication manner and shorter access delay are achieved.

18 Claims, 9 Drawing Sheets

(51) Int. Cl.
*H04W 48/02* (2009.01)
*H04W 12/08* (2009.01)
*H04W 48/16* (2009.01)
H04W 84/04 (2009.01)
H04W 88/02 (2009.01)

(52) U.S. Cl.
CPC ........... *H04W 12/08* (2013.01); *H04W 48/02* (2013.01); *H04W 48/16* (2013.01); *H04W 84/042* (2013.01); *H04W 88/02* (2013.01)

(56) References Cited

U.S. PATENT DOCUMENTS

| | | | | |
|---|---|---|---|---|
| 2002/0035699 | A1* | 3/2002 | Crosbie | H04L 63/10 726/12 |
| 2003/0065952 | A1* | 4/2003 | Otsuka | H04L 29/12009 726/4 |
| 2008/0016230 | A1* | 1/2008 | Holtmanns | H04L 63/08 709/229 |
| 2010/0161794 | A1* | 6/2010 | Horn | H04W 48/02 709/224 |
| 2017/0208063 | A1* | 7/2017 | Tao | H04W 12/08 |

FOREIGN PATENT DOCUMENTS

| | | |
|---|---|---|
| DE | 102005052263 | 5/2007 |
| WO | 2013169161 | 11/2013 |

OTHER PUBLICATIONS

International Search Report for PCT/CN2014/088868, English Translation attached to original, Both completed by the Chinese Patent Office on Jan. 9, 2015, All together 5 Pages.

\* cited by examiner

COMMUNICATION SYSTEM, ACCESS AUTHENTICATION METHOD AND SYSTEM BASED ON COMMUNICATION SYSTEM

CROSS-REFERENCE TO RELATED APPLICATION

This application is the U.S. national phase of PCT Application No. PCT/CN2014/088868 filed Oct. 17, 2014, which claims priority to Chinese Application No. 201410271224.6 filed Jun. 17, 2014, the disclosures of which are incorporated in their entirety by reference herein.

TECHNICAL FIELD

The present disclosure relates to the field of communication, and more particularly to a communication system and an access authentication method and system based on such a communication system.

BACKGROUND

In the past more than 20 years, a mobile communication technology has been rapidly developed to bring enormous influence to lifestyles and workstyles of people and each aspect such as politics and economy of the society. The human society enters an efficient information age, and service application requirements of each aspect explosively increase to bring great challenges to each aspect such as a frequency, technology and operation of a wireless mobile bandwidth system.

A 5th-Generation (5G) mobile communication technology-based mobile wideband system may become a wireless mobile communication system oriented to a requirement of the human information society after 2020, and it is a network integrating multiple services and multiple technologies, and makes technology evolutions and innovations to meet continuous development requirements of various services such as data and connections in the future and improve user experiences.

Along with improvement of a bandwidth and capability of a wireless mobile communication system, mobile Internet and Internet of things applications oriented to individuals and industries are rapidly developed, and great changes in a mobile communication related industrial ecology may be made. A wireless mobile communication technology and a computer and information technology may be crossed and integrated more closely and deeply, and integrated circuits, device processes, software technologies and the like may also be continuously and rapidly developed to support development of the future 5G mobile wideband industry.

From future 5G vision analysis made according to social responsibilities and functions, terminal users, service applications, network operation and the like, key capability requirements on 5G are concluded from a technical perspective as follows.

Requirement 1: traffic is increased by 1,000 times and unit area throughput is remarkably improved. The industry predicts that total global mobile data traffic may be 1,000 times total mobile data traffic in 2010 till 2020 on the basis of an increase trend of mobile communication network data traffic in recent years. This requires a throughput capability of a unit area, particularly a throughput capability in busy time, to also be improved by 1,000 times to reach more than 100 Gbps/$km^2$.

Requirement 2: the number of connected devices is increased by 100 times. A range of future 5G network users is greatly expanded, and along with rapid development of the Internet of things, the industry predicts that the number of connected devices in 2020 may reach 50-100 billion. This requires the number of devices supported in a unit coverage area to be greatly increased, and the number of devices connected through a 5G mobile network in a unit area in some scenarios reaches 10 billion/$km^2$, and is increased by 100 times compared with 4th-Generation (4G).

Requirement 3: a delay is shorter and reliability is higher. A 5G network is required to provide an experience of always being online for a user and meet requirements of more high-value scenarios such as industrial control and emergency communication. This requires a user-plane delay and a control-plane delay to be further reduced and shortened by 5-10 times to human response limits, for example: 5 ms (touch response), compared with 4G and really provide the experience of always being online on one hand. On the other hand, some services related to life and significant property safety of people require end-to-end reliability to be improved to 99.999% and even 100%.

FIG. 1 is a schematic diagram of a network architecture of a 4G mobile communication technology-based Evolved Packet Core (EPC) according to a related technology. As shown in FIG. 1, the network architecture may include the following parts:

an Evolved Universal Terrestrial Radio Access Network (E-UTRAN): arranged to realize all wireless functions related to an evolved network;

a Mobility Management Entity (MME): responsible for control-plane mobility management, including, but not limited to: user context and mobility state management and temporary user identifier allocation;

a Serving Gateway (S-GW): a user-plane entity responsible for user-plane data route processing;

a Packet Data Network Gateway (PDN GW or P-GW): responsible for a gateway function of access of User Equipment (UE) to a Packet Data Network (PDN), herein it shall be illustrated that the P-GW and the S-GW may be integrated in a physical entity;

a Serving General Packet Radio Service Supporting Node (SGSN);

a Policy and Charging Rule Function (PCRF): arranged to be a policy control decision and flow-based charging control function; and a Home Subscriber Server (HSS): arranged to store user subscription information.

However, for a future 5G network, the abovementioned network architecture mainly has the following shortcomings.

In an existing EPC architecture, services are all integrated in the MME for control, and service access is required to be controlled by the MME, so that a processing delay of service access is prolonged. Therefore, access of high-capacity 5G equipment brings great impact on a centralized MME management mode. In addition, each network element in an existing architecture model adopts a tunnel-connection-based technology, which is unfavorable for distributed dynamic management.

SUMMARY

The present disclosure provides a communication system and an access authentication method and system based on such a communication system, so as to at least solve the problems of complexity and longer processing delay of an access authentication manner provided in the related technology.

According to an aspect of the present disclosure, a communication system is provided.

The communication system according to the embodiment of the present disclosure includes: a context generation function entity, arranged to generate a user context and store the generated user context in a context database matched with the context generation function entity; and a service access control function entity, arranged to acquire the user context from the context database and authenticate, by adopting the user context, a terminal initiating an access request.

Alternatively, the system further includes a service data source function entity, arranged to provide a data source for generating the user context for the context generation function entity.

Alternatively, the system further includes: the service processing function entity; the service access control function entity is further arranged to identify the access request initiated by the terminal, permit the terminal to send service data and forward the service data received from the terminal to the service processing function entity; and the service processing function entity is arranged to perform service processing on the service data.

According to another aspect of the present disclosure, an access authentication method based on the abovementioned communication system is provided.

The access authentication method according to the embodiment of the present disclosure includes that: a service access control function entity receives an access request message from a terminal, herein the access request message contains identification information of a terminal user; and the service access control function entity acquires a user context according to the identification information, and performs access authentication on the terminal by adopting the user context.

Alternatively, the step that the service access control function entity acquires the user context includes that: the service access control function entity sends a request message of acquiring the user context to a context database, herein the request message contains the identification information; and the service access control function entity receives a response message from the context database, herein the response message contains the user context corresponding to the identification information.

Alternatively, after the step that the service access control function entity receives the response message from the context database, the method further includes that: the context database determines a service access control function entity to be accessed by the terminal, the service access control function entity being adjacent to the service access control function entity; and the context database sends the user context to the adjacent service access control function entity.

Alternatively, the step that the service access control function entity acquires the user context includes that: the service access control function entity sends a request message of acquiring the user context to one or more service access control function entities and the context database respectively, the one or more service access control function entities being adjacent to the service access control function entity, herein the request message contains the identification information; and the service access control function entity stores the user context corresponding to the identification information in a first received response message, and discards user contexts in other response messages.

Alternatively, the step that the service access control function entity acquires the user context includes that: the service access control function entity sends a request message of acquiring the user context to the context database, herein the request message contains the identification information, and the request message is forwarded to an adjacent service access control function entity through the context database under the condition that the context database finds that the user context is stored in the adjacent service access control function entity; and the service access control function entity receives a response message from the adjacent service access control function entity, herein the response message may contain the user context corresponding to the identification information.

Alternatively, the step that the service access control function entity performs access authentication on the terminal by adopting the user context includes that: the service access control function entity judges whether to permit access of the terminal or not by adopting the user context; and if YES, the service access control function entity returns an access acknowledgement message to the terminal.

Alternatively, after the step that the service access control function entity performs access authentication by adopting the user context, the method further includes that: the service access control function entity receives an updating request message from the context database, herein the updating request message is arranged to update the user context; and the service access control function entity forwards the updating request message to an adjacent service access control function entity which has acquired the user context from the service access control function entity.

Alternatively, after the step that the service access control function entity forwards the updating request message, the method further includes that: the service access control function entity judges whether the terminal is currently in an inactive state or not and whether a time length for which the terminal is in the inactive state exceeds a preset threshold value or not; if YES, the user context is directly deleted; and if NO, the user context is updated according to the updating request message.

Alternatively, after the step that the service access control function entity performs access authentication on the terminal by adopting the user context, the method further includes that: the service access control function entity receives a service request message from the terminal; and the service access control function entity identifies the service request message, and selects a service processing function entity for the terminal according to the user context and capability information of the user, wherein the service processing function entity serves for the terminal.

Alternatively, after the step that the service access control function entity selects the service processing function entity for the terminal, the method further includes that: the service access control function entity receives a service data message from the terminal, and inserts the user context into the service data message; and the service access control function entity sends the service data message to the service processing function entity.

Alternatively, after the step that the service access control function entity sends the service data message to the service processing function entity, the method further includes that: the service processing function entity extracts the user context from the service data message; and the service processing function entity performs service processing on the service data message by adopting the user context and a preset service processing logic.

Alternatively, after the step that the service access control function entity performs access authentication on the terminal by adopting the user context, the method further includes that: the service access control function entity receives a service request message from the terminal; the service access control function entity identifies the service request message, and selects a service processing function entity for the terminal according to the user context and capability information of the terminal, wherein the service processing function entity serves for the terminal; and the service access control function entity sends the user context to the service processing function entity.

Alternatively, after the step that the service access control function entity sends the user context to the service processing function entity, the method further includes that: the service access control function entity receives a service data message from the terminal, and inserts associated information of the user context into the service data message; and the service access control function entity sends the service data message to the service processing function entity.

Alternatively, after the step that the service access control function entity sends the service data message to the service processing function entity, the method further includes that: the service processing function entity extracts the associated information from the service data message; the service processing function entity acquires context information according to the associated information; and the service processing function entity performs service processing on the service data message by adopting the user context and a preset service processing logic.

Alternatively, after the step that the service access control function entity selects the service processing function entity for the terminal, the method further includes that: the service access control function entity receives a service data message from the terminal, and inserts associated information of the user context into the service data message; and the service access control function entity sends the service data message to the service processing function entity.

Alternatively, after the step that the service access control function entity sends the service data message to the service processing function entity, the method further includes that: the service processing function entity extracts the associated information from the service data message; the service processing function entity acquires the user context from the context database according to the associated information; and the service processing function entity performs service processing on the service data message by adopting the user context and a preset service processing logic.

Alternatively, after the step that the service access control function entity selects the service processing function entity for the terminal, the method further includes that: the service access control function entity does not forward the service data message through the service processing function entity under the condition of determining that it is unnecessary to perform service processing on the service data message through the service processing function entity.

According to another aspect of the present disclosure, an access authentication system based on the abovementioned communication system is provided.

The access authentication method and system according to the embodiment of the present disclosure includes: a service access control function entity; the service access control function entity includes: a first receiving module, arranged to receive an access request message from a terminal, herein the access request message contains identification information of a terminal user; and an authentication module, arranged to acquire a user context according to the identification information, and by adopting the user context, perform access authentication on the terminal.

Alternatively, the authentication module includes: a first sending unit, arranged to send a request message of acquiring the user context to a context database, herein the request message contains the identification information; and a first receiving unit, arranged to receive a response message from the context database, herein the response message contains the user context corresponding to the identification information.

Alternatively, the abovementioned system further includes: the context database; the context database includes: a determination module, arranged to determine a service access control function entity to be accessed by the terminal, the service access control function entity being adjacent to the service access control function entity; and a first sending module, arranged to send the user context to the adjacent service access control function entity.

Alternatively, the authentication module may include: a second sending unit, arranged to send a request message of acquiring the user context to one or more service access control function entities and the context database respectively, the one or more service access control function entities being adjacent to the service access control function entity, herein the request message contains the identification information; and a processing unit, arranged to store the user context corresponding to the identification information in a first received response message, and discard user contexts in other response messages.

Alternatively, the authentication module may include: a third sending unit, arranged to send a request message of acquiring the user context to the context database, herein the request message contains the identification information, and the request message is forwarded to an adjacent service access control function entity through the context database under the condition that the context database finds that the user context is stored in the adjacent service access control function entity; and a second receiving unit, arranged to receive a response message from the adjacent service access control function entity, herein the response message contains the user context corresponding to the identification information.

Alternatively, the authentication module includes: a judgment unit, arranged to judge whether to permit access of the terminal or not by adopting the user context; and a feedback unit, arranged to return an access acknowledgement message to the terminal if output of the judgment unit is YES.

Alternatively, the service access control function entity further includes: a second receiving module, arranged to receive an updating request message from the context database, herein the updating request message is arranged to update the user context; and a forwarding module, arranged to forward the updating request message to an adjacent service access control function entity which has acquired the user context from the service access control function entity.

Alternatively, the service access control function entity m further includes: a judgment module, arranged to judge whether the terminal is currently in an inactive state or not and whether a time length for which the terminal is in the inactive state exceeds a preset threshold value or not; a deletion module, arranged to directly delete the user context when output of the judgment module is YES; and an updating module, arranged to update the user context according to the updating request message when the output of the judgment module is NO.

Alternatively, the service access control function entity further includes: a third receiving module, arranged to receive a service request message from the terminal; and a first identification module, arranged to identify the service request message, and select a service processing function entity for the terminal according to the user context and capability information of the user, wherein the service processing function entity serves for the terminal.

Alternatively, the service access control function entity further includes: a fourth receiving module, arranged to receive a service data message from the terminal, and insert the user context into the service data message; and a second sending module, arranged to send the service data message to the service processing function entity.

Alternatively, the system further includes: the service processing function entity; the service processing function entity may include: a first extraction module, arranged to extract the user context from the service data message; and a first processing module, arranged to perform service processing on the service data message by adopting the user context and a preset service processing logic.

Alternatively, the service access control function entity further includes: a fifth receiving module, arranged to receive a service request message from the terminal; a second identification module, arranged to identify the service request message, and select a service processing function entity for the terminal according to the user context and capability information of the terminal, wherein the service processing function entity serves for the terminal; and a third sending module, arranged to send the user context to the service processing function entity.

Alternatively, the service access control function entity further includes: a sixth receiving module, arranged to receive a service data message from the terminal, and insert associated information of the user context into the service data message; and a fourth sending module, arranged to send the service data message to the service processing function entity.

Alternatively, the service processing function entity further includes: a second extraction module, arranged to extract the associated information from the service data message; a first acquisition module, arranged to acquire context information according to the associated information; and a second processing module, arranged to perform service processing on the service data message by adopting the user context and a preset service processing logic.

Alternatively, the service access control function entity may further include: a seventh receiving module, arranged to receive a service data message from the terminal, and insert associated information of the user context into the service data message; and a fifth sending module, arranged to send the service data message to the service processing function entity.

Alternatively, the service processing function entity further includes: a third extraction module, arranged to extract the associated information from the service data message; a second acquisition module, arranged to acquire the user context from the context database according to the associated information; and a third processing module, arranged to perform service processing on the service data message by adopting the user context and a preset service processing logic.

Alternatively, the service access control function entity further includes: a fourth processing module, arranged not to forward the service data message through the service processing function entity under the condition of determining that it is unnecessary to perform service processing on the service data message through the service processing function entity.

According to the embodiment of the present disclosure, the context generation function entity is arranged to generate the user context and store the generated user context in the context database matched with the context generation function entity; the service access control function entity is arranged to acquire the user context from the context database and authenticate the terminal initiating the access request by adopting the user context, so that the problems that the access authentication manner provided in the related technology is comparatively complex and the processing delay is comparative higher are solved, thereby achieving the effects that the access authentication manner is simpler and the access delay is shorter.

BRIEF DESCRIPTION OF DRAWINGS

The drawings described here are adopted to provide a further understanding to the present disclosure, and constitute a part of the present disclosure. Schematic embodiments of the present disclosure and descriptions thereof are adopted to explain the present disclosure and not intended to constitute improper limits to the present disclosure. In the drawings.

SPECIFIC EMBODIMENTS OF THE PRESENT DISCLOSURE

The present disclosure will be described below with reference to the drawings and embodiments in detail. It shall be illustrated that the embodiments in the present disclosure and characteristics in the embodiments may be freely combined under the condition of no conflicts.

Figure 1:
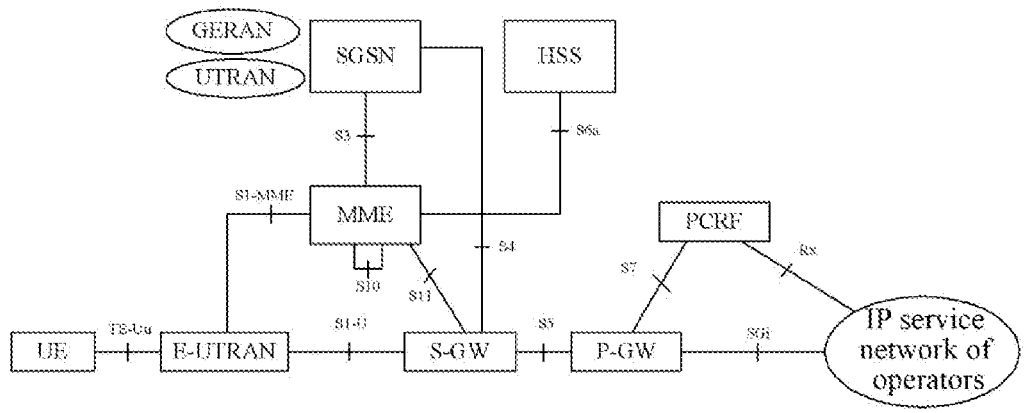
FIG. 1 is a schematic diagram of a network architecture of a 4G EPC according to the related technology.
Figure 2:
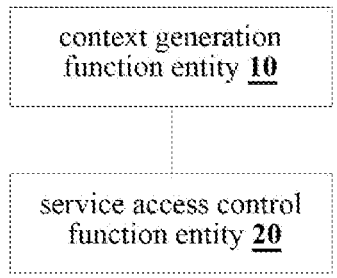
FIG. 2 is a structure block diagram of a communication system according to an embodiment of the present disclosure.

FIG. 2 is a structure block diagram of a communication system according to an embodiment of the present disclosure. As shown in FIG. 2, the communication system may include: a context generation function entity 10, arranged to generate a user context and store the generated user context in a context database matched with the context generation function entity; and a service access control function entity 20, arranged to acquire the user context from the context database and authenticate a terminal initiating an access request by adopting the user context.

An access authentication manner provided in the related technology is comparatively complex and the processing delay is higher. By adopting the system shown in FIG. 2, an MME in an existing EPC architecture is not adopted for service access control any more, but instead, a manner of combining the context generation function entity and the service access control function entity is adopted for service access authentication. Therefore, the problems the access authentication manner is comparatively complex and the processing delay is longer provided in the related technology are solved, thereby achieving the effects the access authentication manner is simple and the access delay is lower.

Figure 3:
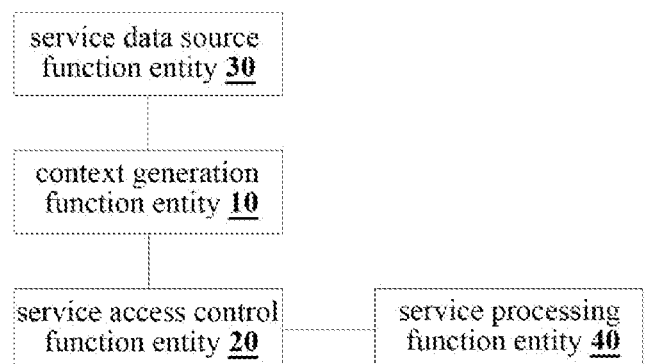
FIG. 3 is a structure block diagram of a communication system according to an embodiment of the present disclosure.

Alternatively, as shown in FIG. 3, the abovementioned system further includes: a service data source function entity 30, arranged to provide a data source for generating the user context for the context generation function entity.

Alternatively, as shown in FIG. 3, the abovementioned system further includes: a service processing function entity 40; the service access control function entity is further arranged to identify the access request initiated by the terminal, permit the terminal to send service data and forward the service data received from the terminal to the service processing function entity; and the service processing function entity is arranged to perform service processing on the service data.

Figure 4:
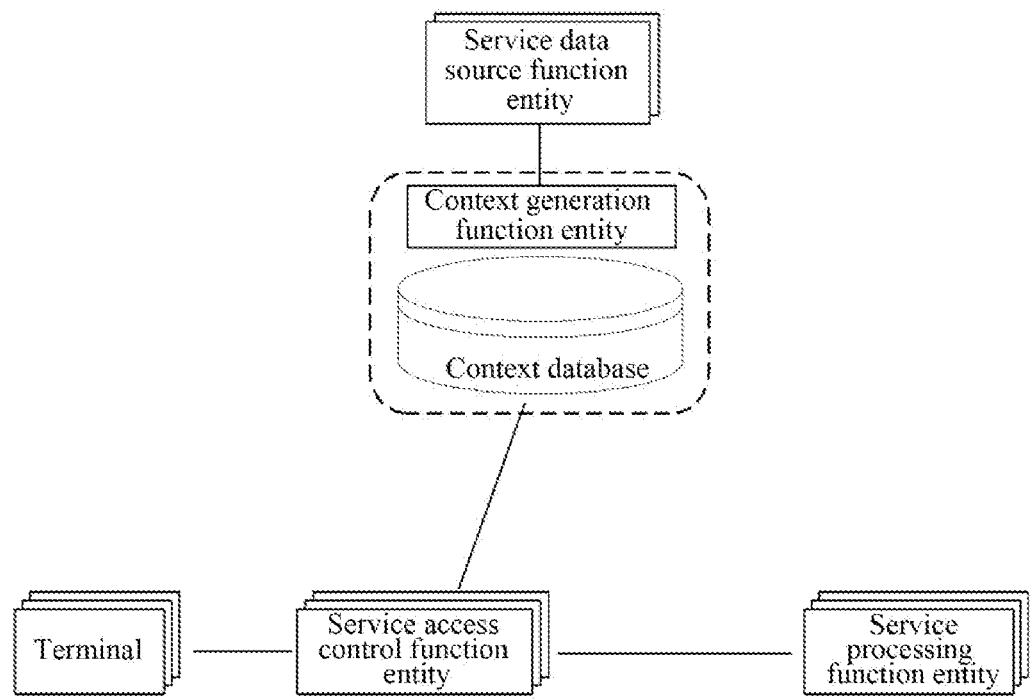
FIG. 4 is a schematic diagram of a communication system according to an alternative embodiment of the present disclosure.
Figure 5:
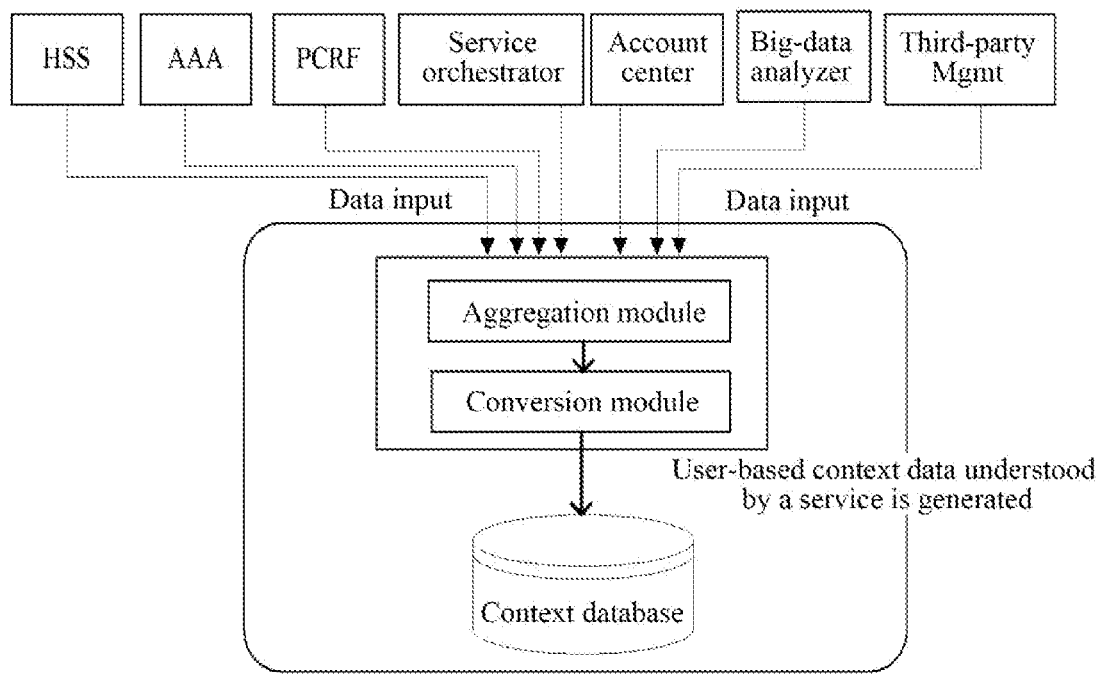
FIG. 5 is a structure diagram of a service data source function entity according to an alternative embodiment of the present disclosure.

As an alternative embodiment of the present disclosure, FIG. 4 is a schematic diagram of a communication system according to an alternative embodiment of the present disclosure. As shown in FIG. 4, the communication system may include: a service data source function entity, a context generation function entity, a context database, a service access control function entity and a service processing function entity. Each function entity may specifically realize functions as follows:

(1) The service data source function entity is mainly responsible for providing a data source for the context generation function entity. FIG. 5 is a structure diagram of a service data source function entity according to an alternative embodiment of the present disclosure. As shown in FIG. 5, the service data source function entity may include, but not limited to: a telecommunication network element HSS, an Authentication, Accounting and Authorization (AAA) server, a service orchestrator, an account center and a big-data analyzer and third-party Management (Mgmt) platform.

(2) The context generation function entity and the context database are mainly responsible for collecting and summarizing service data source data related to a user and converting it into a user-based context data format or file understood by a service, and when a user terminal accesses a network, are responsible for pushing user context data or file to a user access or an adjacent service access control function entity, herein the abovementioned user context may include, but not limited to, the following information:

1) service subscription information of the user (for example: a service the user has subscribed);

2) QoS information of the user (for example: guaranteed bandwidth and maximum and minimum bandwidth information subscribed by the user);

3) user level information (for example: user priority information);

4) accounting information of the user;

5) behavioral habit information of the user;

6) security authorization and authentication information of the user;

7) service routing policy information of the user; and 8) third-party management information.

Figure 6:
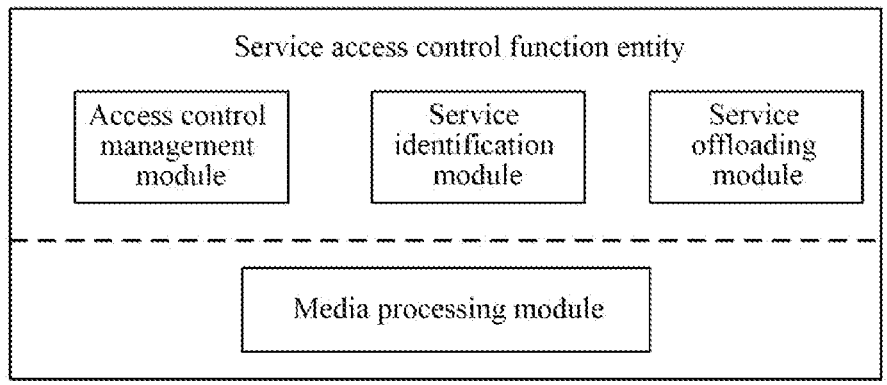
FIG. 6 is a structure block diagram of a service access control function entity according to an alternative embodiment of the present disclosure.

(3) The service access control function entity: FIG. 6 is a structure block diagram of a service access control function entity according to an alternative embodiment of the present disclosure, and as shown in FIG. 6, the service access control function entity may include: an access control management module, arranged to perform management and control, authentication and authorization on an access and service request of the user terminal according to the user context; a service identification module, arranged to identify a service initiated by the user; a service offloading module, arranged to select a service processing function entity for the user terminal according to user context information and capability information of the user terminal, wherein the service processing function entity serves for the terminal; and a media processing module, arranged to convert a forwarding-plane data message format initiated by the user terminal, for example: operation of inserting related information of the user context and the like.

(4) The service processing function entity is responsible for performing service processing on a received data message according to the user context information notified by the service access control function entity and a preset service processing logic.

Figure 7:
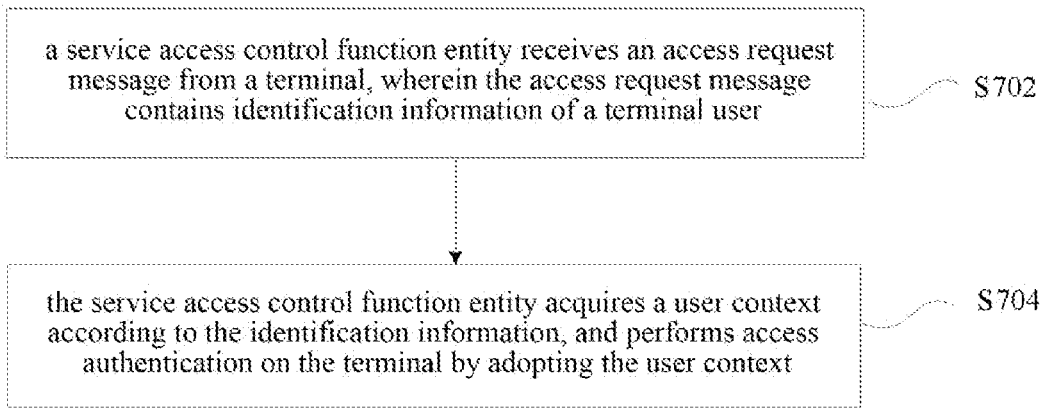
FIG. 7 is a flowchart of an access authentication method based on a communication system according to an embodiment of the present disclosure.

FIG. 7 is a flowchart of an access authentication method based on a communication system according to an embodiment of the present disclosure. As shown in FIG. 7, the method may include the following steps:

Step S702: a service access control function entity receives an access request message from a terminal, herein the access request message contains identification information of a terminal user; and Step S704: the service access control function entity acquires a user context according to the identification information, and performs access authentication on the terminal by adopting the user context.

Alternatively, in Step S704, the operation that the service access control function entity acquires the user context may include the following operation:

Step S1: the service access control function entity sends a request message of acquiring the user context to a context database, herein the request message contains the identification information; and Step S2: the service access control function entity receives a response message from the context database, herein the response message contains the user context corresponding to the identification information.

Figure 8:
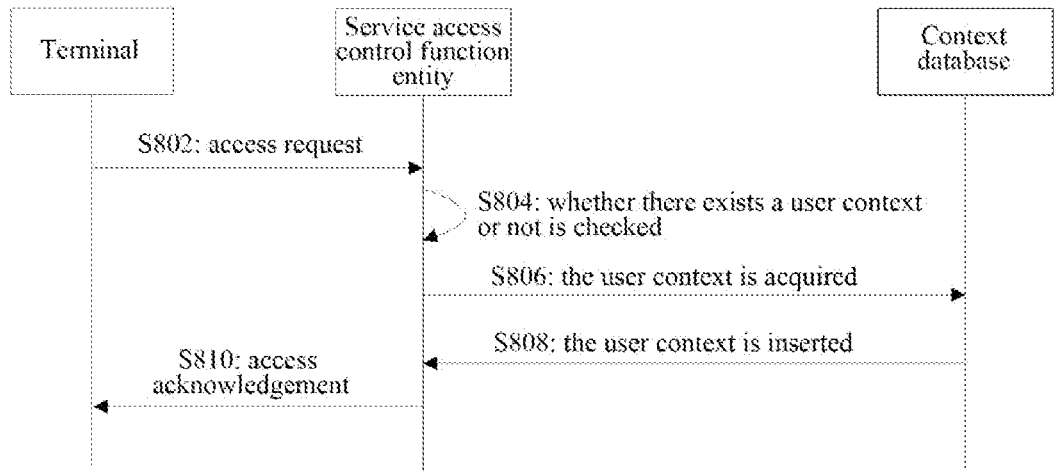
FIG. 8 is a flowchart of a method for a service access control function entity to acquire a user context when a user terminal accesses a network according to alternative embodiment 1 of the present disclosure.

FIG. 8 is a flowchart of a method for a service access control function entity to acquire a user context when a user terminal accesses a network according to alternative embodiment 1 of the present disclosure. As shown in FIG. 8, the flow may include the following steps:

Step S802: the terminal sends an access request message to the service access control function entity, herein the access request message contains the identification information of the user;

Step S804: the service access control function entity checks whether there exists valid user context data or file or not, context validity being judged according to a valid state in the context, for example: a valid lifecycle or other state information of the context, and if YES, Step S810 is directly executed;

Step S806: if it is found that there does not exist any valid context, the service access control function entity sends a request message of acquiring the user context to the context database, herein the request message contains the identification information of the user;

Step S808: the context database records address information of the service access control function entity acquiring the context, and inserts a user context message to return the user context to the service access control function entity; and Step S810: the service access control function entity may authenticate access of the user terminal according to the user context information, and returns an access acknowledgement to the terminal if permitting the user terminal to access.

Alternatively, after the operation that the service access control function entity receives the response message from the context database in Step S2, the method may further include the following steps:

Step S3: the context database determines a service access control function entity to be accessed by the terminal, the service access control function entity being adjacent to the service access control function entity; and Step S4: the context database sends the user context to the adjacent service access control function entity.

Figure 9:
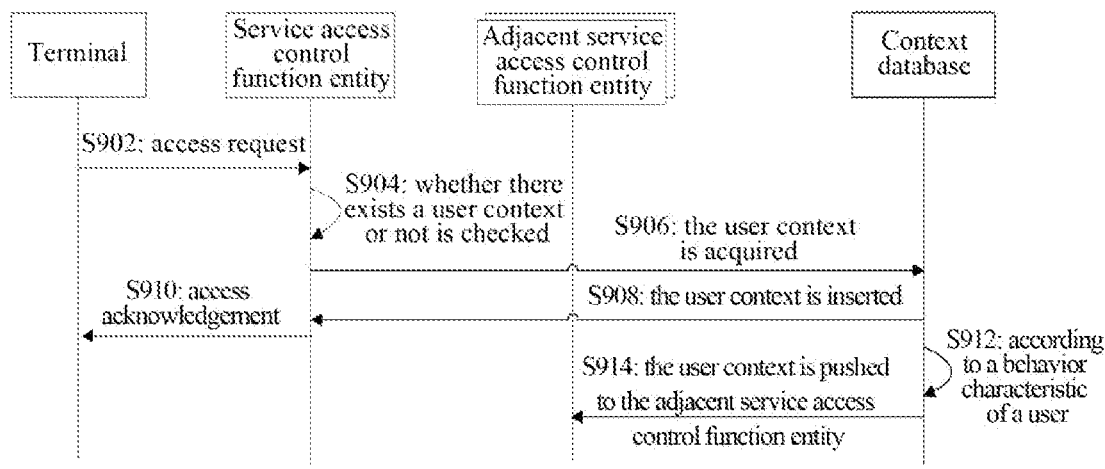
FIG. 9 is a flowchart of a method for a service access control function entity to acquire a user context when a user terminal accesses a network according to alternative embodiment 2 of the present disclosure.
Figure 10:
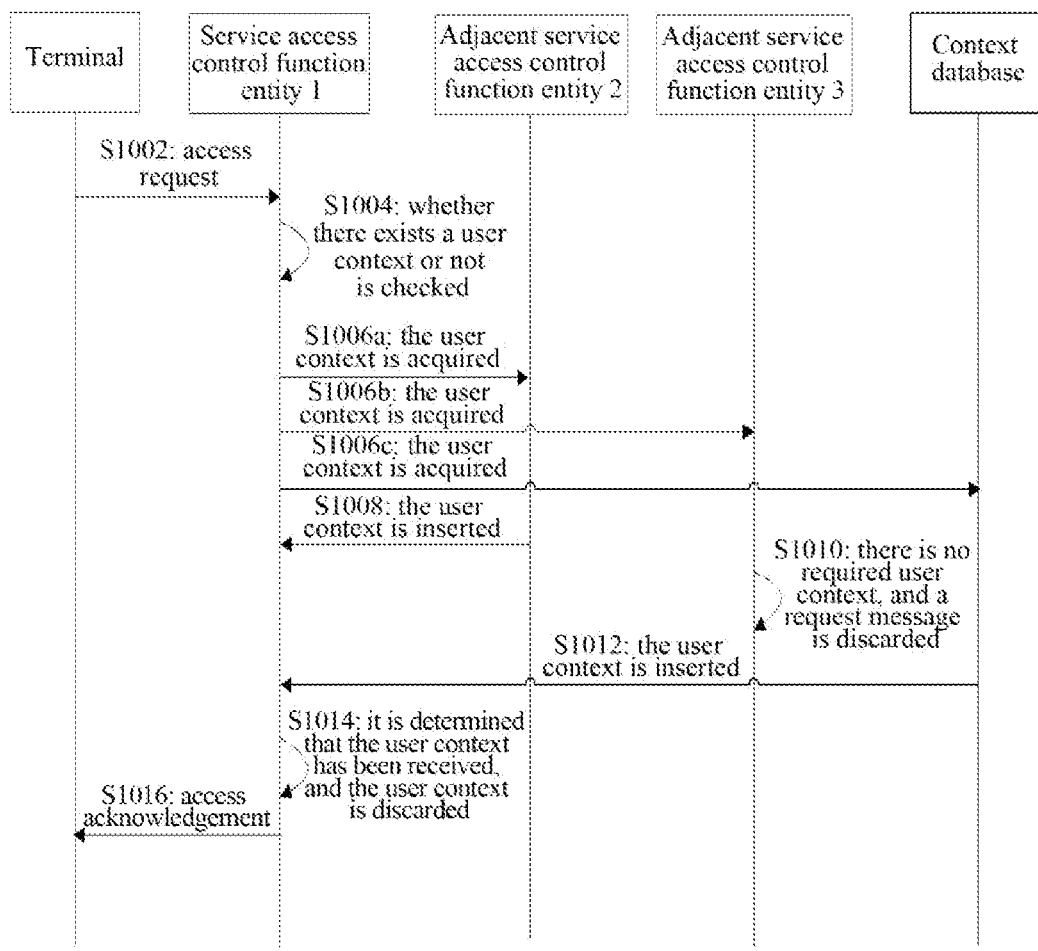
FIG. 10 is a flowchart of a method for a service access control function entity to acquire a user context when a user terminal accesses a network according to alternative embodiment 3 of the present disclosure.

FIG. 9 is a flowchart of a method for a service access control function entity to acquire a user context when a user terminal accesses a network according to alternative embodiment 2 of the present disclosure. As shown in FIG. 9, the flow may include the following steps:

Step S902: the terminal sends an access request message to the service access control function entity, herein the access request message contains the identification information of the user;

Step S904: the service access control function entity checks whether there exists valid user context data or file or not, context validity being judged according to a valid state in the context, for example: a valid lifecycle or other state information of the context, and if YES, Step 910 is directly executed;

Step S906: if it is found that there does not exist any valid context, the service access control function entity sends a request message of acquiring the user context to the context database, herein the request message contains the identification information of the user;

Step S908: the context database records address information of the service access control function entity acquiring the context, and inserts a user context message to return the user context to the service access control function entity;

Step S910: the service access control function entity may authenticate access of the user terminal according to the user context information, and returns an access acknowledgement to the terminal if permitting the user terminal to access;

Step S912: the context database senses a behavior characteristic of the user, and if finding that the user terminal is a high-mobility terminal or another factor, the context database determines to actively push the user context data or file to an adjacent service access control function entity accessed by the user to make it is unnecessary for the service access control function entity to acquire the context from the context database when the user moves to the adjacent service access control function entity; and Step S914: the context database notifies and pushes the user context data or file to the adjacent service access control function entity for the service access control function entity to store the context.

Alternatively, the operation that the service access control function entity acquires the user context in Step S704 may include the following operation:

Step S5: the service access control function entity sends a request message of acquiring the user context to one or more service access control function entities and the context database respectively, the one or more service access control function entities being adjacent to the service access control function entity, herein the request message contains the identification information; and Step S6: the service access control function entity stores the user context corresponding to the identification information in a first received response message, and discards user contexts in other response messages.

FIG. S10 is a flowchart of a method for a service access control function entity to acquire a user context when a user terminal accesses a network according to embodiment 3 of the present disclosure. As shown in FIG. 8, the flow may include the following processing steps:

Step S1002: the terminal sends an access request message to service access control function entity 1, herein the access request message contains the identification information of the user;

Step S1004: service access control function entity 1 checks whether there exists valid user context data or file or not, and if YES, Step 1016 is directly executed;

Step S1006a-Step S1006c: in order to increase a user context acquisition speed of service access control function entity 1, service access control function entity 1 simultaneously sends a context acquisition request to adjacent service access control function entity 2 and adjacent service access control function entity 3, and simultaneously sends the context acquisition request to the context database;

Step S1008: adjacent service access control function entity 2 judges that there exists a valid user context after receiving the request, and then returns user context data or file to service access control function entity 1, and service access control function entity 1 stores first received context information;

Step S1010: service access control function entity 3 judges that there does not exist any valid user context after receiving the request, and discards the abovementioned request;

Step S1012: the context database may also return a user context to service access control function entity 1 after receiving the request;

Step S1014: service access control function entity 1 determines that the context information has been acquired after receiving the context information returned by the context database, and discards the context information; and Step S1016: service access control function entity 1 may authenticate access of the user terminal according to the user context information, and returns an access acknowledgement to the terminal if permitting the user terminal to access.

Alternatively, the operation that the service access control function entity acquires the user context in Step S704 may include the following steps:

Step S7: the service access control function entity sends a request message of acquiring the user context to the context database, herein the request message contains the identification information, and the request message is forwarded to an adjacent service access control function entity through the context database under the condition that the context database finds that the user context is stored in the adjacent service access control function entity; and Step S8: the service access control function entity receives a response message from the adjacent service access control function entity, herein the response message contains the user context corresponding to the identification information.

Figure 11:
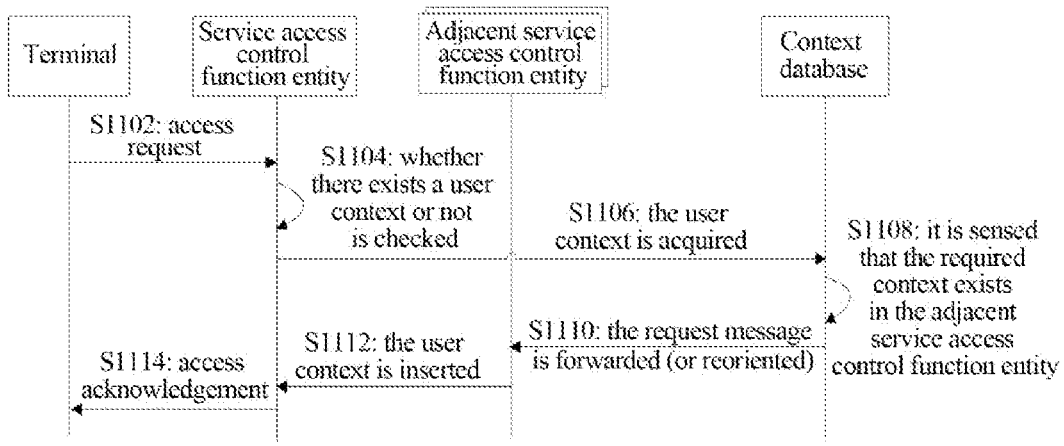
FIG. 11 is a flowchart of a method for a service access control function entity to acquire a user context when a user terminal accesses a network according to alternative embodiment 4 of the present disclosure.

FIG. 11 is a flowchart of a method for a service access control function entity to acquire a user context when a user terminal accesses a network according to alternative embodiment 4 of the present disclosure. As shown in FIG. 11, the flow may include the following processing steps:

Step S1102: the terminal sends an access request message to the service access control function entity, herein the access request message contains the identification information of the user;

Step S1104: the service access control function entity checks whether there exists valid user context data or file or not, and if YES, Step 1114 is directly executed;

Step S1106: if finding that there does not exist any valid context, the service access control function entity sends a request message of acquiring the user context to the context database, herein the request message contains the identification information of the user;

Step S1108: the context database finds that the user context requested by the service access control function entity exists in its adjacent service access control function entity;

Step S1110: the context database forwards (or reorients) the request message to the adjacent service access control function entity;

Step S1112: the adjacent service access control function entity determines that there exists a valid user context after receiving the abovementioned request message, and then returns the user context data or file to the service access control function entity, and the service access control function entity stores the received user context information; and Step S1114: the service access control function entity may authenticate access of the user terminal according to the user context information, and returns an access acknowledgement to the terminal if permitting the user terminal to access.

In an alternative implementation process, the operation that the service access control function entity performs access authentication on the terminal by adopting the user context in Step S704 may include the following operation:

Step S9: the service access control function entity judges whether to permit access of the terminal or not by adopting the user context; and Step S10: if YES, the service access control function entity returns an access acknowledgement message to the terminal.

Alternatively, after the operation that the service access control function entity performs access authentication by adopting the user context in Step S704, the method may further include the following operation:

Step S11: the service access control function entity receives an updating request message from the context database, herein the updating request message is arranged to update the user context; and Step S12: the service access control function entity forwards the updating request message to an adjacent service access control function entity which has acquired the user context from the service access control function entity.

Alternatively, after the operation that the service access control function entity forwards the updating request message in Step S12, the method may further include the following steps:

Step S13: the service access control function entity judges whether the terminal is currently in an inactive state or not and whether a time length for which the terminal is in the inactive state exceeds a preset threshold value or not;

Step S14: if YES, the user context is directly deleted; and

Step S15: if NO, the user context is updated according to the updating request message.

Figure 12:
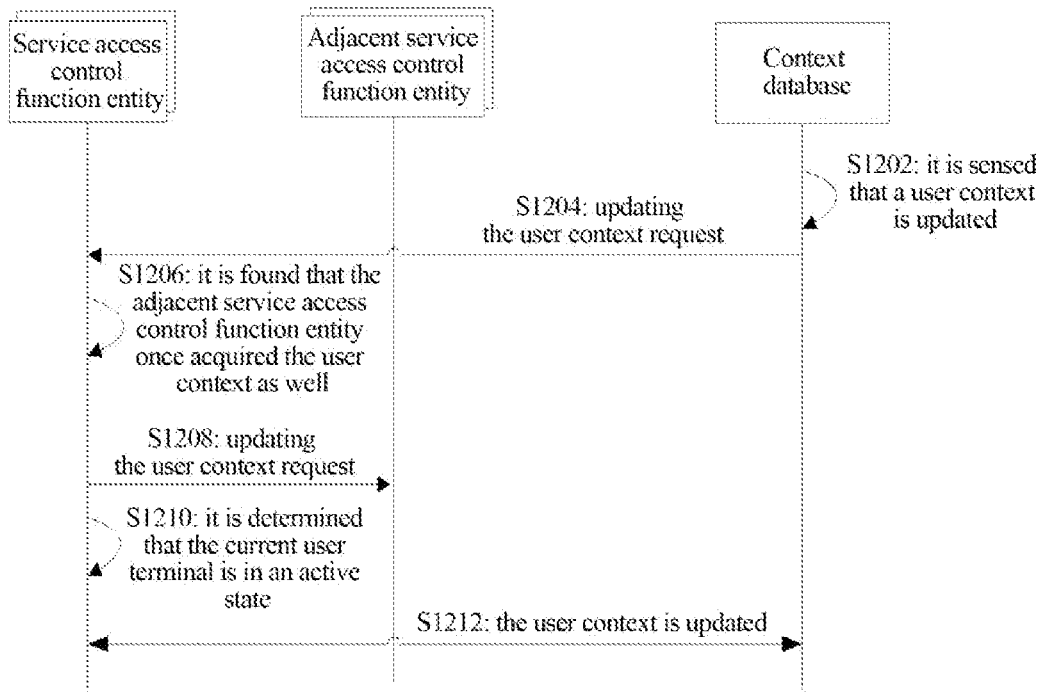
FIG. 12 is a flowchart of a user context data or document changing method according to a alternative embodiment of the present disclosure.

FIG. 12 is a flowchart of a user context data or document changing method according to a alternative embodiment of the present disclosure. As shown in FIG. 12, the method may include the following processing steps:

Step S1202: the context database senses that the user context has changed or gotten invalid;

Step S1204: the context database acquires the address information of the service access control function entity acquiring the user context according to a record, and then sends a context updating request message to the service access control function entity, herein the context updating request message may contain the latest user context;

Step S1206: the service access control function entity finds that an adjacent service access control function entity once acquired the user context as well;

Step S1208: the service access control function entity sends the context updating request message to the adjacent service access control function entity;

Step S1210: the service access control function entity checks to find that the user terminal corresponding to the user context is in the inactive state, and if time for which the user terminal is kept inactive in the service access control function entity has exceeded the preset threshold value, deletes the stored user context, otherwise continues executing Step S1212; and Step S1212: the service access control function entity updates the user context of the context database.

It shall be illustrated that Step S1212 is an optional step, and if the user context has been included or the context database has indicated that the context is invalid in Step S1204, Step S1212 is not required to be executed any more.

Alternatively, after the operation that the service access control function entity performs access authentication on the terminal by adopting the user context in Step S704, the method may further include the following operation:

Step S16: the service access control function entity receives a service request message from the terminal; and Step S17: the service access control function entity identifies the service request message, and selects a service processing function entity for the terminal according to the user context and capability information of the user, wherein the service processing function entity serves for the terminal.

Alternatively, after the operation that the service access control function entity selects the service processing function entity for the terminal in Step S17, the method may further include the following operation:

Step S18: the service access control function entity receives a service data message from the terminal, and inserts the user context into the service data message; and Step S19: the service access control function entity sends the service data message to the service processing function entity.

Alternatively, after the operation that the service access control function entity sends the service data message to the service processing function entity in Step S19, the method may further include the following steps:

Step S20: the service processing function entity extracts the user context from the service data message; and Step S21: the service processing function entity performs service processing on the service data message by adopting the user context and a preset service processing logic.

Figure 13:
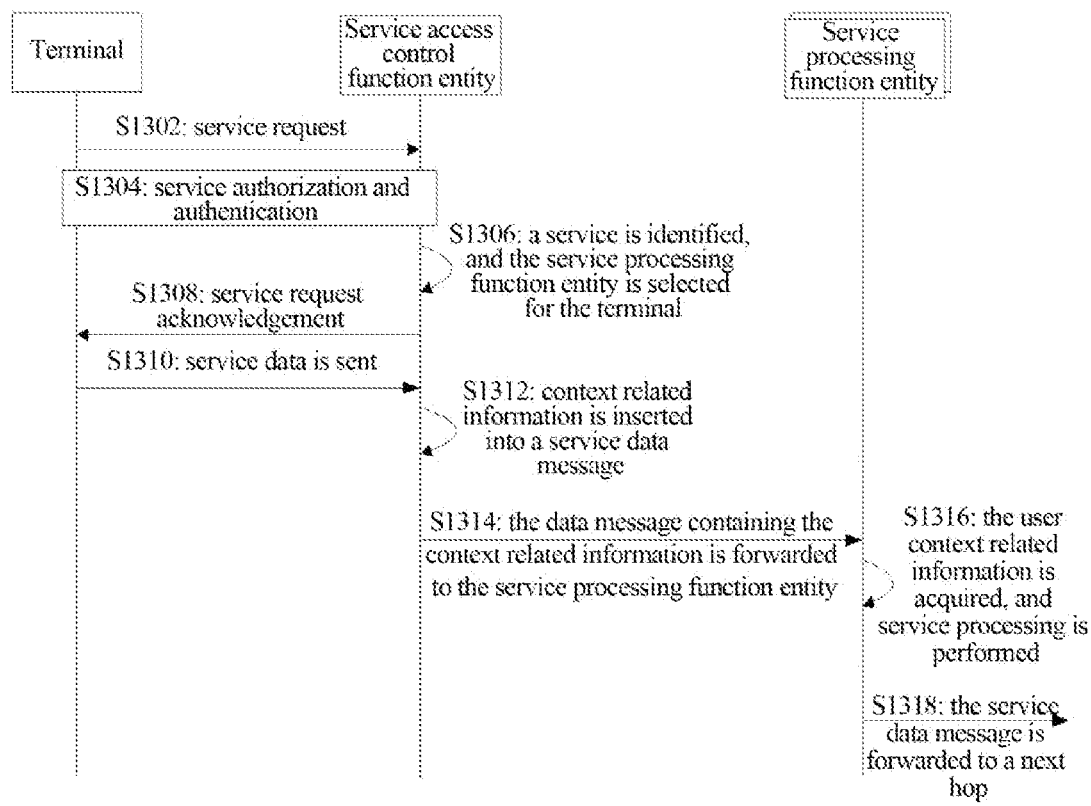
FIG. 13 is a flowchart of execution of service processing when a user terminal initiates a service according to alternative embodiment 1 of the present disclosure.

FIG. 13 is a flowchart of execution of service processing when a user terminal initiates a service according to alternative embodiment 1 of the present disclosure. As shown in FIG. 13, the flow may include the following processing steps:

Step S1302: the terminal initiates a service request message, herein the service request message contains information such as an identifier of the user and an initiated service type;

Step S1304: the service access control function entity performs authentication and authorization on a service initiated by the user terminal;

Step S1306: the service access control function entity identifies the service initiated by the user, and selects a service processing function entity which serves for a current service of the user according to subscription information in the user context and capability information of the terminal;

Step S1308: the service access control function entity returns a service request acknowledgement message to the user terminal if the service request of the user passes authentication;

Step S1310: the user terminal sends a service data message to a network;

Step S1312: the service access control function entity inserts context information corresponding to the user into the received service data message;

Step 1314: the service access control function entity forwards the service data message to the abovementioned selected service processing function entity;

Step S1316: the service processing function entity acquires the user context information inserted into the service data message, and performs service processing on the received service data message according to a preset service processing logic; and Step S1318: the service processing function entity forwards the processed service data message to a next hop.

Alternatively, after the operation that the service access control function entity performs access authentication on the terminal by adopting the user context in Step S704, the method may further include the following operation:

Step S22: the service access control function entity receives a service request message from the terminal;

Step S23: the service access control function entity identifies the service request message, and selects a service processing function entity for the terminal according to the user context and capability information of the terminal, wherein the service processing function entity serves for the terminal; and Step S24: the service access control function entity sends the user context to the service processing function entity.

Alternatively, after the operation that the service access control function entity sends the user context to the service processing function entity in Step S24, the method may further include the following operation:

Step S25: the service access control function entity receives a service data message from the terminal, and inserts associated information of the user context into the service data message; and Step S26: the service access control function entity sends the service data message to the service processing function entity.

Alternatively, after the operation that the service access control function entity sends the service data message to the service processing function entity in Step S26, the method may further include the following steps:

Step S27: the service processing function entity extracts the associated information from the service data message;

Step S28: the service processing function entity acquires context information according to the associated information; and Step S29: the service processing function entity performs service processing on the service data message by adopting the user context and a preset service processing logic.

Figure 14:
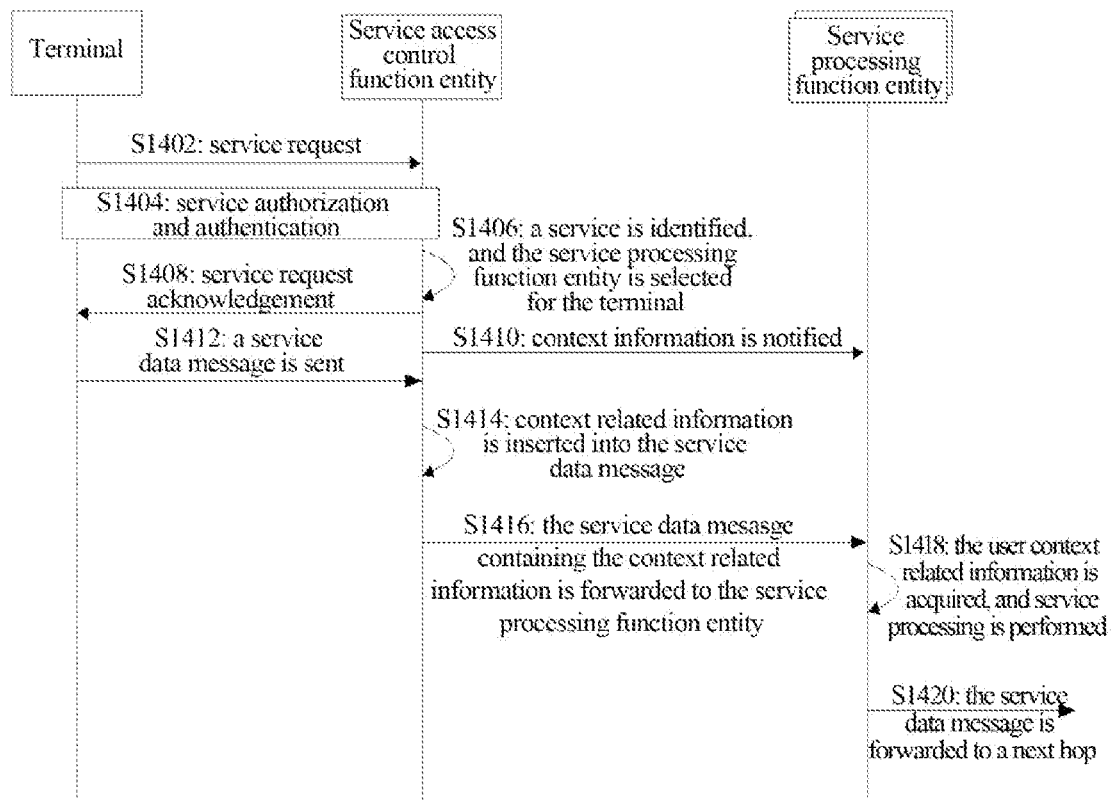
FIG. 14 is a flowchart of execution of service processing when a user terminal initiates a service according to alternative embodiment 2 of the present disclosure.

FIG. 14 is a flowchart of execution of service processing when a user terminal initiates a service according to alternative embodiment 2 of the present disclosure. As shown in FIG. 14, the flow may include the following processing steps:

Step S1402: the terminal initiates a service request message, herein the service request message contains information such as an identifier of the user and an initiated service type;

Step S1404: the service access control function entity performs authentication and authorization on a service initiated by the user terminal;

Step S1406: the service access control function entity identifies the service initiated by the user, and selects a service processing function entity which serves for a current service of the user according to subscription information in the user context and capability information of the terminal;

Step S1408: the service access control function entity returns a service request acknowledgement message to the user terminal if the service request of the user passes authentication;

Step S1410: the service access control function entity transmits the user context information to the selected service processing function entity;

Step S1412: the user terminal sends a service data message to a network;

Step S1414: the service access control function entity inserts context associated information, for example: context identification information, corresponding to the user into the received service data message;

Step S1416: the service access control function entity forwards the service data message to the abovementioned selected service processing function entity;

Step S1418: the service processing function entity acquires the user context associated information in the service data message, associates the obtained user context information according to the user context associated information, and performs service processing on the received service data message according to a preset service processing logic; and Step S1420: the service processing function entity forwards the processed service data message to a next hop.

Alternatively, after the operation that the service access control function entity selects the service processing function entity for the terminal in Step S17, the method may further include the following steps:

Step S30: the service access control function entity receives a service data message from the terminal, and inserts associated information of the user context into the service data message; and Step S31: the service access control function entity sends the service data message to the service processing function entity.

Alternatively, after the operation that the service access control function entity sends the service data message to the service processing function entity in Step S31, the method may further include the following operation:

Step S32: the service processing function entity extracts the associated information from the service data message;

Step S33: the service processing function entity acquires the user context from the context database according to the associated information; and Step S34: the service processing function entity performs service processing on the service data message by adopting the user context and a preset service processing logic.

Figure 15:
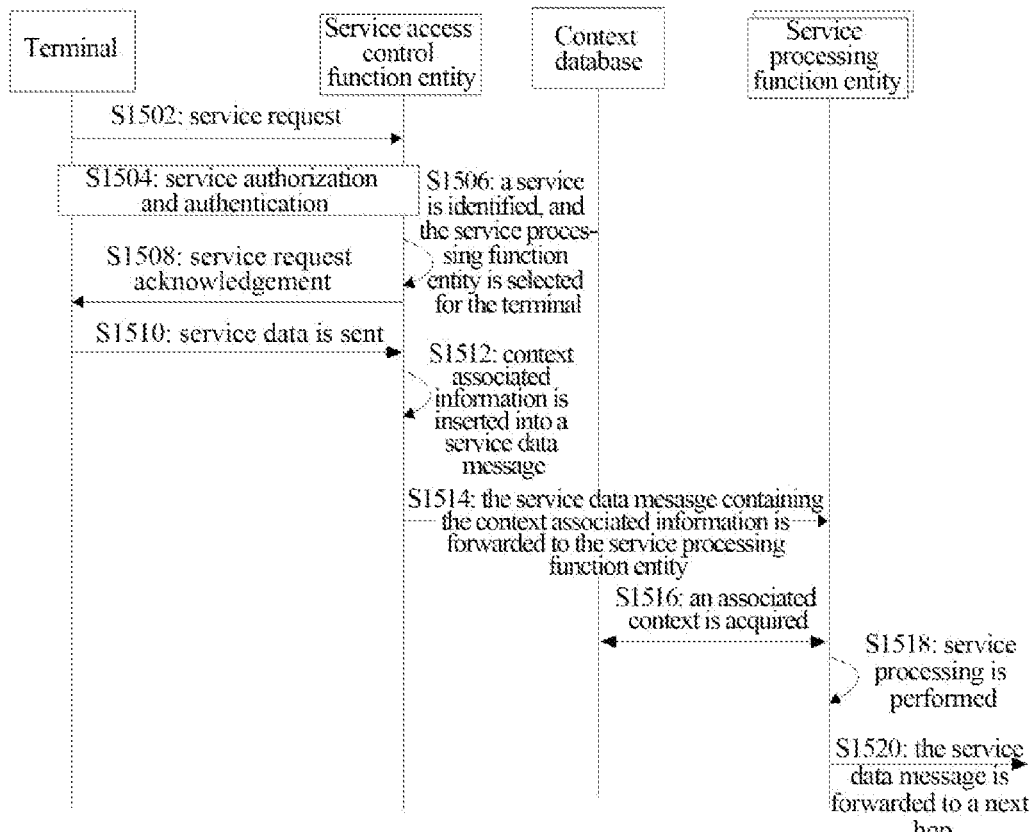
FIG. 15 is a flowchart of execution of service processing when a user terminal initiates a service according to alternative embodiment 3 of the present disclosure.

FIG. 15 is a flowchart of execution of service processing when a user terminal initiates a service according to alternative embodiment 3 of the present disclosure. As shown in FIG. 15, the flow may include the following processing steps:

Step S1502: the terminal initiates a service request message, herein the service request message contains information such as an identifier of the user and an initiated service type;

Step S1504: the service access control function entity performs authentication and authorization on a service initiated by the user terminal;

Step S1506: the service access control function entity identifies the service initiated by the user, and selects a service processing function entity which serves for a current service of the user according to subscription information in the user context and capability information of the terminal;

Step S1508: the service access control function entity returns a service request acknowledgement message to the user terminal if the service request of the user passes authentication;

Step S1510: the user terminal sends a service data message to a network;

Step S1512: the service access control function entity inserts context associated information, for example: context identification information, corresponding to the user into the received service data message;

Step S1514: the service access control function entity forwards the service data message to the abovementioned selected service processing function entity;

Step S1516: the service processing function entity acquires the user context information from the context database according to the context associated information in the service data message;

Step S1518: the service processing function entity performs service processing on the received service data message according to a preset service processing logic; and Step S1520: the service processing function entity forwards the processed service data message to a next hop.

Alternatively, after the operation that the service access control function entity selects the service processing function entity for the terminal in Step S17, the method may further include the following step:

Step S35: the service access control function entity does not forward the service data message through the service processing function entity under the condition of determining that it is unnecessary to perform service processing on the service data message through the service processing function entity.

Figure 16:
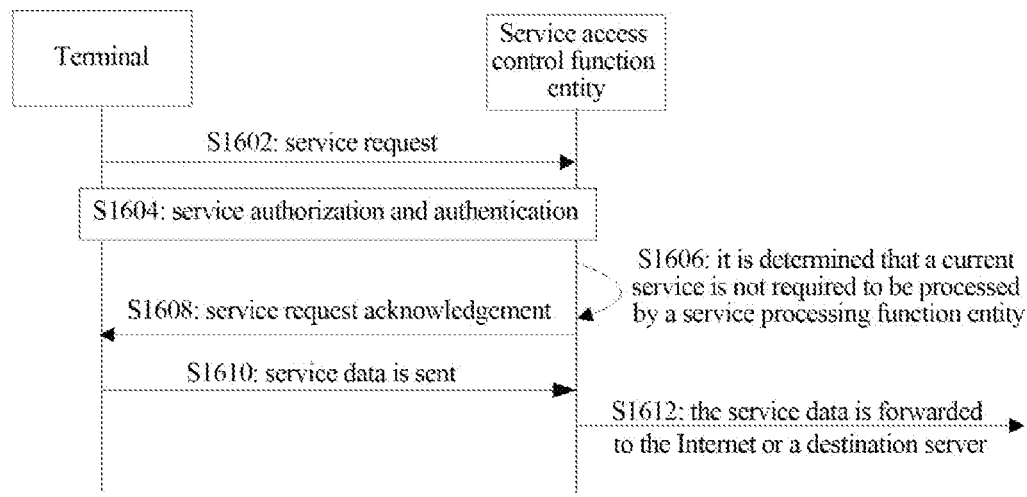
FIG. 16 is a flowchart of execution of service processing when a user terminal initiates a service according to alternative embodiment 4 of the present disclosure.

FIG. 16 is a flowchart of execution of service processing when a user terminal initiates a service according to alternative embodiment 4 of the present disclosure. As shown in FIG. 16, the flow may include the following processing steps:

Step S1602: the terminal initiates a service request message, herein the service request message contains information such as an identifier of the user and an initiated service type;

Step S1604: the service access control function entity performs authentication and authorization on a service initiated by the user terminal;

Step S1606: the service access control function entity identifies a service initiated by the user, and selects a service processing function entity which serves for the current service of the user according to subscription information in the user context and capability information of the terminal, herein the service access control function entity finds that the current service initiated by the user is not required to be processed by the service processing function entity in the alternative embodiment;

Step S1608: the service access control function entity returns a service request acknowledgement message to the user terminal if the service request of the user passes authentication;

Step S1610: the user terminal sends a service data message to a network; and

Step S1612: the service access control function entity considers that it is unnecessary for the service processing function entity to process the received service data message, and then forwards the service data message to the Internet or a destination server.

Figure 17:
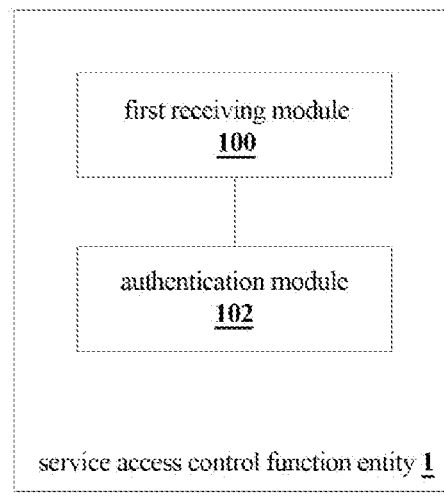
FIG. 17 is a structure block diagram of an access authentication system based on a communication system according to an embodiment of the present disclosure.

FIG. 17 is a structure block diagram of an access authentication system based on a communication system according to an embodiment of the present disclosure. As shown in FIG. 17, the access authentication system may include: a service access control function entity 1; the service access control function entity 1 may include: a first receiving module 100, arranged to receive an access request message from a terminal, herein the access request message may contain identification information of a terminal user; and an authentication module 102, arranged to acquire a user context according to the identification information, and perform access authentication on the terminal by adopting the user context.

Alternatively, the authentication module 102 may include: a first sending unit (not shown in the figure), arranged to send a request message of acquiring the user context to a context database, herein the request message contains the identification information; and a first receiving unit (not shown in the figure), arranged to receive a response message from the context database, herein the response message may contain the user context corresponding to the identification information.

Figure 18:
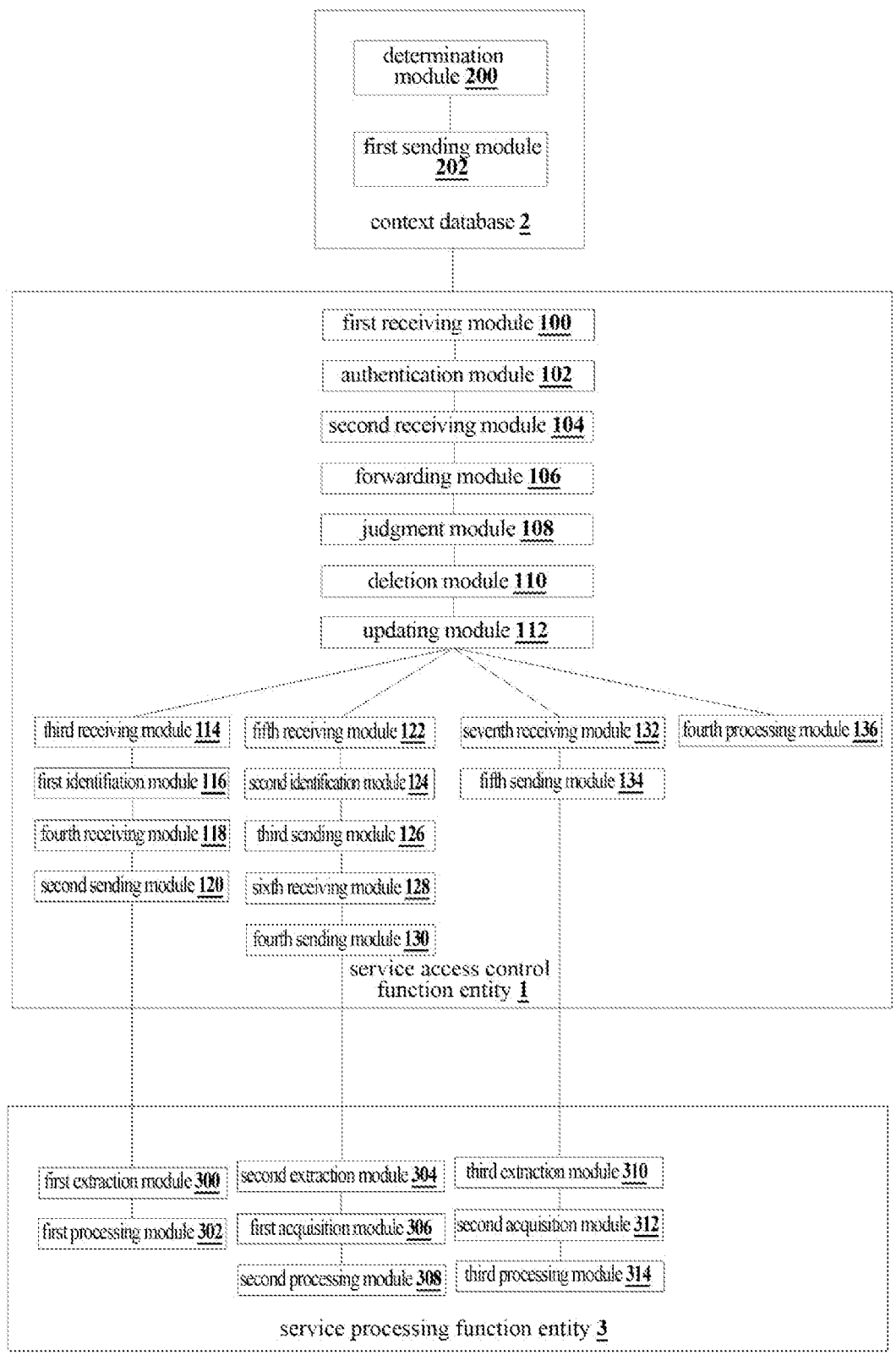
FIG. 18 is a structure block diagram of an access authentication system based on a communication system according to an alternative embodiment of the present disclosure.

Alternatively, as shown in FIG. 18, the abovementioned system may further include: the context database 2; the context database 2 may include: a determination module 200, arranged to determine a service access control function entity to be accessed by the terminal, the service access control function entity being adjacent to the service access control function entity; and a first sending module 202, arranged to send the user context to the adjacent service access control function entity.

Alternatively, the authentication module 102 may include: a second sending unit (not shown in the figure), arranged to send a request message of acquiring the user context to one or more service access control function entities and the context database respectively, the one or more service access control function entities being adjacent to the service access control function entity, herein the request message contains the identification information; and a processing unit (not shown in the figure), arranged to store the user context corresponding to the identification information in a first received response message, and discard user contexts in other response messages.

Alternatively, the authentication module 102 may include: a third sending unit (not shown in the figure), arranged to send a request message of acquiring the user context to the context database, herein the request message contains the identification information, and the request message is forwarded to an adjacent service access control function entity through the context database under the condition that the context database finds that the user context is stored in the adjacent service access control function entity; and a second receiving unit (not shown in the figure), arranged to receive a response message from the adjacent service access control function entity, herein the response message contains the user context corresponding to the identification information.

Alternatively, the authentication module 102 may include: a judgment unit (not shown in the figure), arranged to judge whether to permit access of the terminal or not by adopting the user context; and a feedback unit (not shown in the figure), arranged to return an access acknowledgement message to the terminal if output of the judgment unit is YES.

Alternatively, as shown in FIG. 18, the service access control function entity 1 may further include: a second receiving module 104, arranged to receive an updating request message from the context database, herein the updating request message may be arranged to update the user context; and a forwarding module 106, arranged to forward the updating request message to an adjacent service access control function entity which has acquired the user context from the service access control function entity.

Alternatively, as shown in FIG. 18, the service access control function entity 1 may further include: a judgment module 108, arranged to judge whether the terminal is currently in an inactive state or not and whether a time length for which the terminal is in the inactive state exceeds a preset threshold value or not; a deletion module 110, arranged to directly delete the user context when output of the judgment module is YES; and an updating module 112, arranged to update the user context according to the updating request message when the output of the judgment module is NO.

Alternatively, as shown in FIG. 18, the service access control function entity 1 may further include: a third receiving module 114, arranged to receive a service request message from the terminal; and a first identification module 116, arranged to identify the service request message, and select a service processing function entity for the terminal according to the user context and capability information of the user, wherein the service processing function entity serves for the terminal.

Alternatively, as shown in FIG. 18, the service access control function entity 1 may further include: a fourth receiving module 118, arranged to receive a service data message from the terminal, and insert the user context into the service data message; and a second sending module 120, arranged to send the service data message to the service processing function entity.

Alternatively, as shown in FIG. 18, the abovementioned system may further include: a service processing function entity 3; the service processing function entity 3 may include: a first extraction module 300, arranged to extract the user context from the service data message; and a first processing module 302, arranged to perform service processing on the service data message by adopting the user context and a preset service processing logic.

Alternatively, as shown in FIG. 18, the service access control function entity 1 may further include: a fifth receiving module 122, arranged to receive a service request message from the terminal; a second identification module 124, arranged to identify the service request message, and select a service processing function entity for the terminal according to the user context and capability information of the terminal, wherein the service processing function entity serves for the terminal; and a third sending module 126, arranged to send the user context to the service processing function entity.

Alternatively, as shown in FIG. 18, the service access control function entity may further include: a sixth receiving module 128, arranged to receive a service data message from the terminal, and insert associated information of the user context into the service data message; and a fourth sending module 130, arranged to send the service data message to the service processing function entity.

Alternatively, as shown in FIG. 18, the service processing function entity 3 may further include: a second extraction module 304, arranged to extract the associated information from the service data message; a first acquisition module 306, arranged to acquire context information according to the associated information; and a second processing module 308, arranged to perform service processing on the service data message by adopting the user context and a preset service processing logic.

Alternatively, as shown in FIG. 18, the service access control function entity 1 may further include: a seventh receiving module 132, arranged to receive a service data message from the terminal, and insert associated information of the user context into the service data message; and a fifth sending module 134, arranged to send the service data message to the service processing function entity.

Alternatively, as shown in FIG. 18, the service processing function entity 3 may further include: a third extraction module 310, arranged to extract the associated information from the service data message; a second acquisition module 312, arranged to acquire the user context from the context database according to the associated information; and a third processing module 314, arranged to perform service processing on the service data message by adopting the user context and a preset service processing logic.

Alternatively, as shown in FIG. 18, the service access control function entity 1 may further include: a fourth processing module 136, arranged not to forward the service data message through the service processing function entity under the condition of determining that it is unnecessary to perform service processing on the service data message through the service processing function entity.

From the above, it can be seen that the abovementioned embodiment achieves the following technical effects (it shall be illustrated that these effects are effects which may be achieved by some alternative embodiments): by adopting the technical solutions provided by the embodiment of the present disclosure, the problems that the access authentication manner is comparatively complex and the processing delay is higher provided in the related technology are solved, thereby achieving the effects the access authentication manner is simple and the access delay is lower.

Apparently, those skilled in the art should know that each of the abovementioned modules or each of the abovementioned steps of the present disclosure may be implemented by a universal computing device, and the modules or steps may be concentrated on a single computing device or distributed on a network formed by a plurality of computing devices, and may alternatively be implemented by program codes executable for the computing devices, so that the modules or steps may be stored in a storage device for execution with the computing devices, the shown or described steps may be executed in sequences different from those described here under some circumstances, or may form each integrated circuit module respectively, or multiple modules or steps therein may form a single integrated circuit module for implementation. As a consequence, the present disclosure is not limited to the combination of any specific hardware and software.

What is mentioned above is only the alternative embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, the communication system and access authentication method and system based on the communication system provided by the embodiment of the present disclosure have the following beneficial effects: an access authentication manner is simple and the processing delay is lower.

What we claim is:

1. A communication system, comprising: a context generation function entity comprising a processor for performing operations of the context generation function entity; a service access control function entity comprising a processor for performing operations of the service access control function entity; and a context database matched with the context generation function entity; wherein:
   the context generation function entity is arranged to generate a user context and store the user context in the context database;
   the service access control function entity is arranged to acquire the user context from the context database and authenticate, by adopting the user context, a terminal initiating an access request;
   the service access control function entity is arranged to acquire the user context from the context database by:
      sending a request message of acquiring the user context to the context database, wherein the request message contains identification information of a terminal user; and
      receiving a response message from the context database, wherein the response message contains the user context corresponding to the identification information; and
   the context database is configured to determine an adjacent service access control function entity to be accessed by the terminal, the adjacent service access control function entity being adjacent to the service access control function entity, and to send the user context to the adjacent service access control function entity.

2. The system according to claim 1, further comprising: a service data source function entity comprising a processor for performing operations of the service data source function entity; wherein:
   the service data source function entity is arranged to provide a data source for generating the user context for the context generation function entity.

3. The system according to claim 1, further comprising: a service processing function entity comprising a processor for performing operations of the service processing function entity; wherein:
   the service access control function entity is further arranged to identify the access request initiated by the terminal, permit the terminal to send service data and forward the service data received from the terminal to the service processing function entity; and
   the service processing function entity is arranged to perform service processing on the service data.

4. An access authentication method based on a communication system, the communication system comprising a service access control function entity and a context database, and the method comprising:
   receiving, by the service access control function entity, an access request message from a terminal, wherein the access request message contains identification information of a terminal user;
   acquiring, by the service access control function entity, a user context according to the identification information, and performing access authentication on the terminal by adopting the user context;
   wherein acquiring, by the service access control function entity, the user context comprises:
      sending, by the service access control function entity, a request message of acquiring the user context to the context database, wherein the request message contains the identification information; and
      receiving, by the service access control function entity, a response message from the context database, wherein the response message contains the user context corresponding to the identification information; and
   after receiving, by the service access control function entity, the response message from the context database, further comprising:
      determining, by the context database, an adjacent service access control function entity to be accessed by the terminal, the adjacent service access control function entity being adjacent to the service access control function entity; and
      sending, by the context database, the user context to the adjacent service access control function entity.

5. The method according to claim 4,
   wherein performing, by the service access control function entity, access authentication on the terminal by adopting the user context comprises:

judging, by the service access control function entity, whether to permit access of the terminal or not by adopting the user context; and if YES, returning, by the service access control function entity, an access acknowledgement message to the terminal.

6. The method according to claim 4, after performing, by the service access control function entity, access authentication on the terminal by adopting the user context, further comprising:

receiving, by the service access control function entity, an updating request message from the context database, wherein the updating request message is used to update the user context;

forwarding, by the service access control function entity, the updating request message to the adjacent service access control function entity which has acquired the user context from the context database; and after forwarding, by the service access control function entity, the updating request message, judging, by the service access control function entity, whether the terminal is currently in an inactive state or not and whether a time length for which the terminal is in the inactive state exceeds a preset threshold value or not;

if YES, directly deleting the user context; and if NO, updating the user context according to the updating request message.

7. The method according to claim 4, after performing, by the service access control function entity, access authentication on the terminal by adopting the user context, further comprising:

receiving, by the service access control function entity, a service request message from the terminal; and identifying, by the service access control function entity, the service request message, and selecting a service processing function entity for the terminal according to the user context and capability information of terminal, wherein the service processing function entity serves for the terminal.

8. The method according to claim 4, after performing, by the service access control function entity, access authentication on the terminal by adopting the user context, further comprising:

receiving, by the service access control function entity, a service request message from the terminal;

identifying, by the service access control function entity, the service request message, and selecting a service processing function entity for the terminal according to the user context and capability information of the terminal, wherein the service processing function entity serves for the terminal;

sending, by the service access control function entity, the user context to the service processing function entity;

after sending, by the service access control function entity, the user context to the service processing function entity, further comprising:

receiving, by the service access control function entity, a service data message from the terminal, and inserting associated information of the user context into the service data message; and sending, by the service access control function entity, the service data message to the service processing function entity; and after sending, by the service access control function entity, the service data message to the service processing function entity, further comprising:

extracting, by the service processing function entity, the associated information from the service data message;

acquiring, by the service processing function entity, context information according to the associated information; and performing, by the service processing function entity, service processing on the service data message by adopting the user context and a preset service processing logic.

9. The method according to claim 7, after selecting, by the service access control function entity, the service processing function entity for the terminal, further comprising:

receiving, by the service access control function entity, a service data message from the terminal, and inserting the user context into the service data message;

sending, by the service access control function entity, the service data message to the service processing function entity; and after sending, by the service access control function entity, the service data message to the service processing function entity, further comprising:

extracting, by the service processing function entity, the user context from the service data message; and performing, by the service processing function entity, service processing on the service data message by adopting the user context and a preset service processing logic.

10. The method according to claim 7, after selecting, by the service access control function entity, the service processing function entity for the terminal, further comprising:

receiving, by the service access control function entity, a service data message from the terminal, and inserting associated information of the user context into the service data message;

sending, by the service access control function entity, the service data message to the service processing function entity; and after sending, by the service access control function entity, the service data message to the service processing function entity, further comprising:

extracting, by the service processing function entity, the associated information from the service data message;

acquiring, by the service processing function entity, the user context from the context database according to the associated information; and performing, by the service processing function entity, service processing on the service data message by adopting the user context and a preset service processing logic.

11. The method according to claim 7, after selecting, by the service access control function entity, the service processing function entity for the terminal, further comprising:

not forwarding, by the service access control function entity, a service data message through the service processing function entity under the condition of determining that it is unnecessary to perform service processing on the service data message through the service processing function entity.

12. An access authentication system, comprising: a context database and a service access control function entity comprising a processor for performing operations of the service access control function entity, wherein:

the service access control function entity comprises:
  a first receiving module, arranged to receive an access request message from a terminal, wherein the access request message contains identification information of a terminal user; and
  an authentication module, arranged to acquire a user context according to the identification information, and by adopting the user context, perform access authentication on the terminal;
the authentication module comprises:
  a first sending unit, arranged to send a request message of acquiring the user context to the context database, wherein the request message contains the identification information; and
  a first receiving unit, arranged to receive a response message from the context database, wherein the response message contains the user context corresponding to the identification information; and
the context database comprises:
  a determination module, arranged to determine an adjacent service access control function entity to be accessed by the terminal, wherein the adjacent service access control function entity is adjacent to the service access control function entity; and
  a first sending module, arranged to send the user context to the adjacent service access control function entity.

13. The system according to claim 12, wherein:
the authentication module further comprises:
  a judgment unit, arranged to judge whether to permit access of the terminal or not by adopting the user context; and
  a feedback unit, arranged to return an access acknowledgement message to the terminal if output of the judgment unit is YES;
or
the service access control function entity further comprises:
  a second receiving module, arranged to receive an updating request message from the context database, wherein the updating request message is used to update the user context;
  a forwarding module, arranged to forward the updating request message to the adjacent service access control function entity which has acquired the user context from the context database;
  a judgment module, arranged to judge whether the terminal is currently in an inactive state or not and whether a time length for which the terminal is in the inactive state exceeds a preset threshold value or not;
  a deletion module, arranged to directly delete the user context when an output of the judgment module is YES; and
  an updating module, arranged to update the user context according to the updating request message when the output of the judgment module is NO.

14. The system according to claim 12, wherein the service access control function entity further comprises:
  a third receiving module, arranged to receive a service request message from the terminal; and
  a first identification module, arranged to identify the service request message, and select a service processing function entity for the terminal according to the user context and capability information of terminal, wherein the service processing function entity serves for the terminal.

15. The system according to claim 14, wherein:
the service access control function entity further comprises:
  a fourth receiving module, arranged to receive a service data message from the terminal, and insert the user context into the service data message; and
  a second sending module, arranged to send the service data message to the service processing function entity; and
the service processing function entity comprises:
  a first extraction module, arranged to extract the user context from the service data message; and
  a first processing module, arranged to perform service processing on the service data message by adopting the user context and a preset service processing logic.

16. The system according to claim 14, wherein:
the service access control function entity further comprises:
  a seventh receiving module, arranged to receive a service data message from the terminal, and insert associated information of the user context into the service data message; and
  a fifth sending module, arranged to send the service data message to the service processing function entity; and
the service processing function entity comprises:
  a third extraction module, arranged to extract the associated information from the service data message;
  a second acquisition module, arranged to acquire the user context from the context database according to the associated information; and
  a third processing module, arranged to perform service processing on the service data message by adopting the user context and a preset service processing logic;
or
the service access control function entity comprises:
  a fourth processing module, arranged to not forward the service data message through the service processing function entity under the condition of determining that it is unnecessary to perform the service processing on the service data message through the service processing function entity.

17. The system according to claim 12, wherein:
the service access control function entity further comprises:
  a fifth receiving module, arranged to receive a service request message from the terminal;
  a second identification module, arranged to identify the service request message, and select a service processing function entity for the terminal according to the user context and capability information of the terminal, wherein the service processing function entity serves for the terminal;
  a third sending module, arranged to send the user context to the service processing function entity;
  a sixth receiving module, arranged to receive a service data message from the terminal, and insert associated information of the user context into the service data message; and
  a fourth sending module, arranged to send the service data message to the service processing function entity; and
the service processing function entity comprises:
  a second extraction module, arranged to extract the associated information from the service data message;

a first acquisition module, arranged to acquire context information according to the associated information; and a second processing module, arranged to perform service processing on the service data message by adopting the user context and a preset service processing logic.

18. An access authentication method based on a communication system, the communication system comprising a service access control function entity and a context database, and the method comprising:

receiving, by the service access control function entity, an access request message from a terminal, wherein the access request message contains identification information of a terminal user; and acquiring, by the service access control function entity, a user context according to the identification information, and performing access authentication on the terminal by adopting the user context;

wherein acquiring, by the service access control function entity, the user context comprises:

sending, by the service access control function entity, a request message for acquiring the user context to at least one adjacent service access control function entity and the context database respectively, the at least one adjacent service access control function entity being adjacent to the service access control function entity, wherein the request message contains the identification information; and storing, by the service access control function entity, the user context corresponding to the identification information in a first received response message, and discarding user contexts in other response messages;

or wherein acquiring, by the service access control function entity, the user context comprises:

sending, by the service access control function entity, a request message for acquiring the user context to the context database, wherein the request message contains the identification information, and the request message is forwarded to an adjacent service access control function entity through the context database under the condition that the context database finds that the user context is stored in the adjacent service access control function entity; and receiving, by the service access control function entity, a response message from the adjacent service access control function entity, wherein the response message contains the user context corresponding to the identification information;

or wherein performing, by the service access control function entity, access authentication on the terminal by adopting the user context comprises:

judging, by the service access control function entity, whether to permit access of the terminal or not by adopting the user context; and if YES, returning, by the service access control function entity, an access acknowledgement message to the terminal.

\* \* \* \* \*